United States Patent
Stager

(10) Patent No.: US 8,885,453 B2
(45) Date of Patent: Nov. 11, 2014

(54) ENHANCED STOMP-AND-RESTART WITH INTERFERENCE SUPPRESSION

(75) Inventor: Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 236 days.

(21) Appl. No.: 13/249,473

(22) Filed: Sep. 30, 2011

(65) Prior Publication Data

US 2013/0083676 A1     Apr. 4, 2013

(51) Int. Cl.
*H04B 15/00* (2006.01)
*H04L 12/28* (2006.01)
*H04B 7/00* (2006.01)
*H04B 17/00* (2006.01)
*H04B 1/06* (2006.01)
*H04L 27/00* (2006.01)
*H04W 28/18* (2009.01)

(52) U.S. Cl.
CPC ........... *H04L 27/0006* (2013.01); *H04W 28/18* (2013.01); *Y10S 370/913* (2013.01)
USPC ........... 370/201; 370/310; 370/351; 370/913; 455/1; 455/63.1; 455/67.13; 455/130; 455/226.2; 455/234.2; 455/278.1; 455/307

(58) Field of Classification Search
USPC ......... 370/201, 229, 235, 236, 310, 351, 431, 370/901, 902, 912, 913; 455/1, 39, 63.1, 455/67.11, 67.13, 91, 114.2, 115.1, 130, 455/296, 226.1, 226.3, 500, 501, 507, 515, 455/73, 550.1, 561, 562.1
See application file for complete search history.

(56) References Cited

U.S. PATENT DOCUMENTS

| | | | |
|---|---|---|---|
| 2003/0133521 A1* | 7/2003 | Chen et al. | 375/345 |
| 2008/0273512 A1* | 11/2008 | Attar et al. | 370/342 |
| 2011/0299571 A1* | 12/2011 | Del-Toso | 375/148 |
| 2012/0087261 A1* | 4/2012 | Yoo et al. | 370/252 |

OTHER PUBLICATIONS

Santhapuri, Physical Layer Aware MAC Design for Wireless Networks, 2009, pp. 1-139.*
Santhapuri et al., "Message in Message (MIM): A Case for Reordering Transmissions in Wireless Networks," (6 pages), ACM HotNets VII, Oct. 2008.
Manweiler et al., "Order matters: Transmission Reordering in Wireless Networks," MobiCom '09 Proceedings of the 15th annual international conference on Mobile computing and networking, 2009.

* cited by examiner

*Primary Examiner* — Omar Ghowrwal
(74) *Attorney, Agent, or Firm* — Edell, Shapiro & Finnan, LLC

(57) ABSTRACT

Enhanced stomp-and-restart techniques are provided. At a plurality of antennas of a wireless communication device, energy is received in a channel in which one or more frames may be transmitted to the wireless communication device from any one of a plurality of other wireless communication devices. A first frame is acquired from the received energy. Channel state information is computed for the first frame and the channel state information associated with the first frame is stored. Interference suppression parameters are computed for the first frame from the channel state information. It is determined whether a stronger second frame is being received by the wireless communication device. The received energy associated with the first frame is nulled-out using the interference suppression parameters when the stronger second frame is determined to be received so that start-of-packet processing and decoding is performed on the stronger second frame.

22 Claims, 4 Drawing Sheets

ENHANCED STOMP-AND-RESTART WITH INTERFERENCE SUPPRESSION

TECHNICAL FIELD

The present disclosure relates to wireless communication networks and systems.

BACKGROUND

In a Carrier Sense Multiple Access/Collision Avoidance (CSMA/CA) wireless communication system or network, such as an IEEE 802.11 wireless local area network, co-channel frame collisions are inevitable. To maximize throughput the receiver needs to successfully decode one of the frames in the collision.

Mechanisms exist to maximize the probability of successfully decoding one of the frames involved in the collision. One method is a so-called "stomp-and-restart" mechanism in which if, after a receiver has acquired a frame (start-of-packet or "SOP") and begins decoding the data, a subsequent stronger frame is received. The receiver will abort decoding the first frame and re-acquire on the second frame. If the signal strength of the second frame is much larger than that of the first frame, the second frame is likely to be successfully decoded. It is often the case however that the second frame is not substantially stronger than the first frame, in which case both frames are lost.

DESCRIPTION OF EXAMPLE EMBODIMENTS

Overview

Enhanced stomp-and-restart techniques are provided to improve the performance when at least two frames are received at the same time by a wireless communication device. At a plurality of antennas of a wireless communication device, energy is received in a channel in which one or more frames may be transmitted to the wireless communication device from any one of a plurality of other wireless communication devices. A first frame is acquired from the received energy. Channel state information is computed for the first frame and the channel state information associated with the first frame is stored. Interference suppression parameters are computed for the first frame from the channel state information. It is determined whether a stronger second frame is being received by the wireless communication device. The received energy associated with the first frame is nulled-out using the interference suppression parameters when the stronger second frame is determined to be received so that start-of-packet processing and decoding is performed on the stronger second frame.

Example Embodiments

Figure 1:
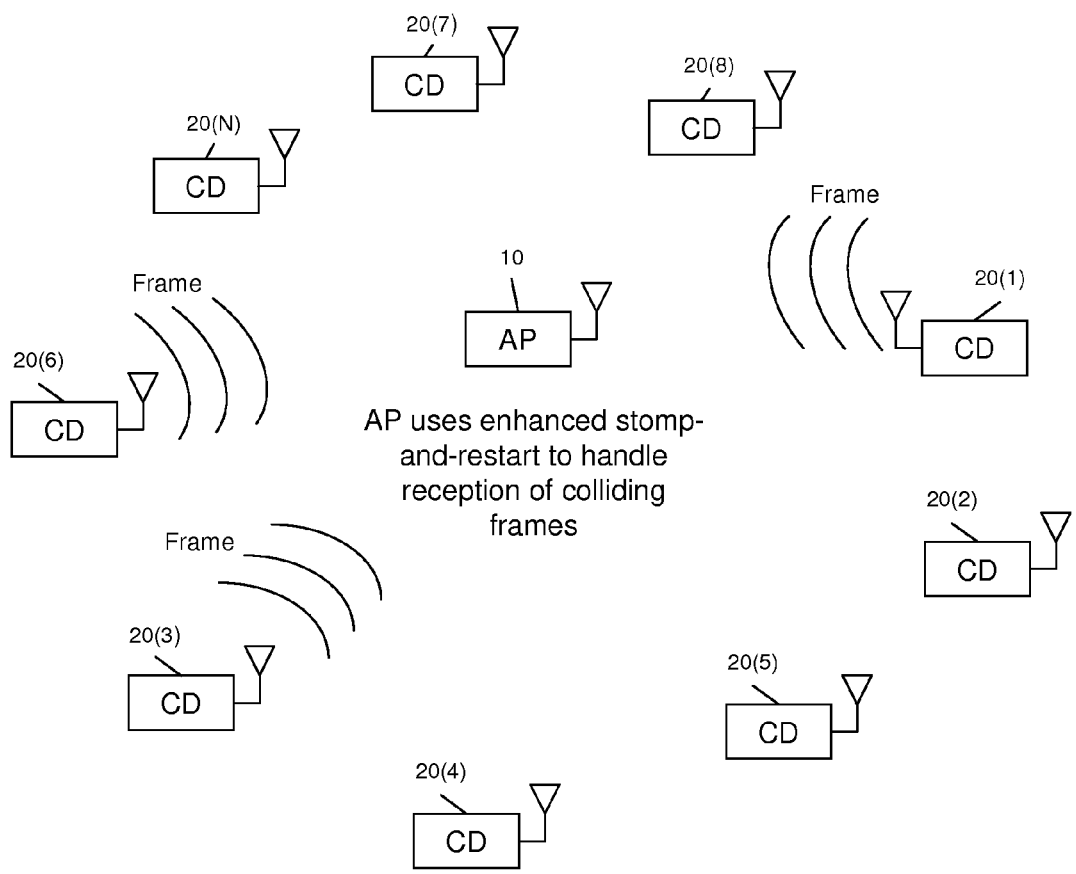
FIG. 1 is a diagram illustrating a wireless communication network in which a wireless communication device is configured to perform enhanced stomp-and-restart techniques when colliding frames are received.

Referring first to FIG. 1, a wireless communication network is shown generally at reference numeral 5 comprising a wireless communication device 10, e.g., an access point (AP), that is configured to wirelessly communicate with a plurality of client devices (CDs) 20(1)-20(N). In one example, the AP 10 and the plurality of CDs 20(1)-20(N) operate in accordance with one of the IEEE 802.11 family of wireless communication protocols. However, the techniques described herein are not limited to any particular wireless communication protocol.

The AP 10 may, during any given time window, be receiving frames (packets) transmitted from one or more of the CDs 20(1)-20(N), such that there is a collisions (in time and frequency) of two or more frames at the AP 10. For example, a first frame from CD 20(3) may be received and nearly at the same time a second frame from CD 20(6) is received. The second frame may be stronger (higher signal strength) than the first frame but because it is colliding with the first frame, it becomes difficult for the AP 10 to decode the stronger second frame. Techniques are provided herein to ensure a high probability of success of decoding the stronger second frame.

Figure 2:
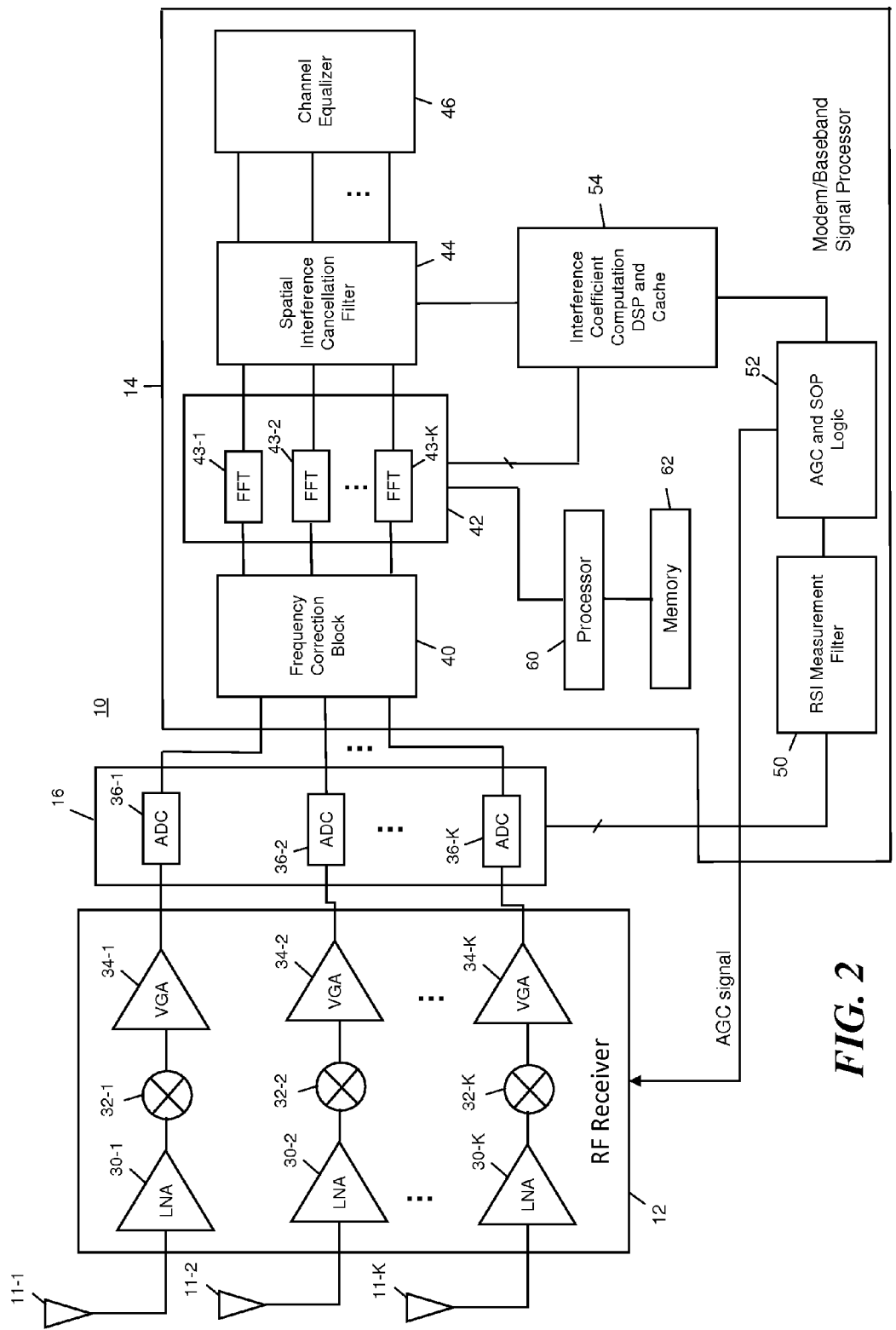
FIG. 2 is a block diagram illustrating an example of a wireless communication device configured to perform the enhanced stomp-and-restart techniques described herein.

Turning now to FIG. 2, an example block diagram of AP 10 that is configured to perform enhanced stomp-and-restart techniques is now described. For simplicity, only the receive processing portion of the AP 10 is shown in FIG. 2, though it should be understood that the AP 10 also has transmit capabilities but the transmit capabilities of the AP are not relevant to the enhanced stomp-and-restart techniques.

The AP 10 comprises a plurality of antennas 11-1 through 11-K, a radio frequency (RF) receiver unit 12 and a baseband signal processor or modem 14. There is also a block of analog-to-digital converters (ADCs) 16 between the RF receiver unit 12 and the modem 14. The RF receiver unit 12 comprises a plurality of low noise amplifiers (LNAs) 30-1 through 30-K, one for a corresponding one of the plurality of antennas 11-1 through 11-K, a corresponding plurality of mixers 32-1 through 32-K, and a corresponding plurality of variable gain amplifiers (VGAs) 34-1 through 34-K. The ADC block 16 comprises a plurality of ADCs 36-1 through 36-K.

The RF receiver unit 12 downconverts energy detected at each of the plurality of antennas 11-1 through 11-K to produce a plurality of analog antenna-specific receive signals. The plurality of analog antenna-specific receive signals are supplied to the ADC block 16, where each ADC 36-1 through 36-K converts a corresponding antenna-specific signal receive to a digital antenna-specific signal for further processing. The gain used by each of the VGAs 34-1 through 34-K is adjustable and controlled by an Automatic Gain Control (AGC) signal supplied by the modem 14 as described further hereinafter.

The modem 14 includes a frequency correction block 40, a Fast Fourier Transform (FFT) block 42 that includes a plurality of FFT modules 43-1 through 43-K, a spatial interference cancellation/suppression filter 44, a channel equalizer 46, a Receive Signal Strength Information (RSSI) measurement filter 50, an AGC and Start-of-Packet (SOP) logic module 52 and an interference coefficient computation Digital Signal Processor (DSP) and cache block 54.

The frequency correction block 40 performs a variety of functions including frequency correction, symbol timing recovery and guard interval removal. The operations of the frequency correction block 40 are not relevant to the enhanced stomp-and-restart techniques described herein and therefore this block is not described in any further detail. The FFT modules 43-1 through 43-K perform FFT processing on corresponding digital antenna-specific receive signals (after frequency correction, symbol timing recovery and guard interval removal). The spatial interference cancellation filter 44 performs spatial filtering by applying to the digital antenna-specific receive signals based on interference suppression parameters computed and supplied by the interference coefficient computation DSP and cache block 54. The spatial interference cancellation filter 44 may be a time-domain filter or a frequency-domain filter. Depending on an implementation chosen (frequency domain processing or time-domain processing), the interference suppression parameters are coefficients/taps for a time-domain interference suppression filter or frequency-dependent receive beamforming weights computed to spatially null out the frame. The outputs of the spatial interference cancellation filter 44 are antenna-specific signals that have been processed to remove any interference associated with undesired signals (as described further hereinafter), also referred to herein as interference-suppressed antenna-specific signals. The channel equalizer 46 performs equalization on the interference suppressed antenna-specific prior to demodulation and data recovery.

The RSSI measurement filter 50 takes digital outputs from the ADC block 16 and measures the RSSI of one or more of the digital antenna-specific receive signals. The AGC and SOP logic block 52 generates adjustments to the AGC signal that is used to control the gain of the VGAs 34-1 through 34-K in the RF receiver unit 12 based on the RSSI of the received energy. Automatic gain control is a well known technique to adjust the gain of VGAs based on a current level of a received signal so that the resulting amplified received signal is within a desired level for further processing (e.g., ADC conversion, FFT processing, etc.) In addition, the AGC and SOP logic block 52 performs SOP processing to begin acquiring and decoding of a frame of a wireless signal in the received energy represented by the digital antenna-specific receive signals.

The interference coefficient computation DSP and cache block 54 performs a variety of computation and control functions. First, it computes channel state information (CSI) for a frame of a received signal from the antenna-specific outputs of the FFT block 42 as shown in FIG. 2. It also stores data representing the CSI. The CSI is derived from the plurality of digital antenna-specific receive signals using any of a variety of now known or hereinafter developed channel state computations. The CSI, in one form, is a matrix quantity (having phase and amplitude components) that represents the over-the-air channel conditions between the plurality of antennas of the AP 10 and the one or more antennas of the CD from which the frame is received.

Second, the interference coefficient computation DSP and cache block 54 computes interference suppression parameters from the CSI for use by the spatial interference cancellation filter 44. The interference suppression parameters are receive beamforming weights that null a frame (the first frame) to allow for reception and decoding of the stronger second frame. The interference suppression parameters computed for a given frame are stored in a memory element of the interference coefficient computation DSP and cache block 54.

Third, the interference coefficient computation DSP and cache block 54 monitors one or more of a level of automatic gain control associated with the RF receiver unit 12 and RSSI associated with the received energy to determine at the same time a first frame is being received, whether a stronger second frame is being received based on a change in at least one of the level of the AGC and the RSSI. In so doing, the interference coefficient computation DSP and cache block 54 saves a current AGC setting and RSSI level compares a change in the level of the AGC with an gain control change threshold and compares the RSSI with a RSSI change threshold. If either of quantities exceeds its corresponding change threshold, it is declared that a second stronger frame is being received and that decoding should proceed on that second stronger frame, and processing of the first frame should be stopped.

In one form, the various blocks of the modem 14 are implemented by digital logic gates in one or more application specific integrated circuits, with or without one or more digital signal processors. In another form, one or more blocks of the modem 14 are implemented by software executed by one or more microprocessor/microcontrollers. To this, FIG. 2 shows a processor 60 and memory 62. Memory 62 may comprise read only memory (ROM), random access memory (RAM), magnetic disk storage media devices, optical storage media devices, flash memory devices, electrical, optical, or other physical/tangible memory storage devices. The processor 60 is, for example, a microprocessor or microcontroller that executes instructions that carry out the enhanced stomp-and-restart techniques described hereinafter in connection with FIGS. 3 and 4. Thus, in general, the memory 62 may comprise one or more tangible computer readable storage media (e.g., a memory device) encoded with software comprising computer executable instructions and when the software is executed (by the processor 62) it is operable to perform the operations described herein.

Figure 3:
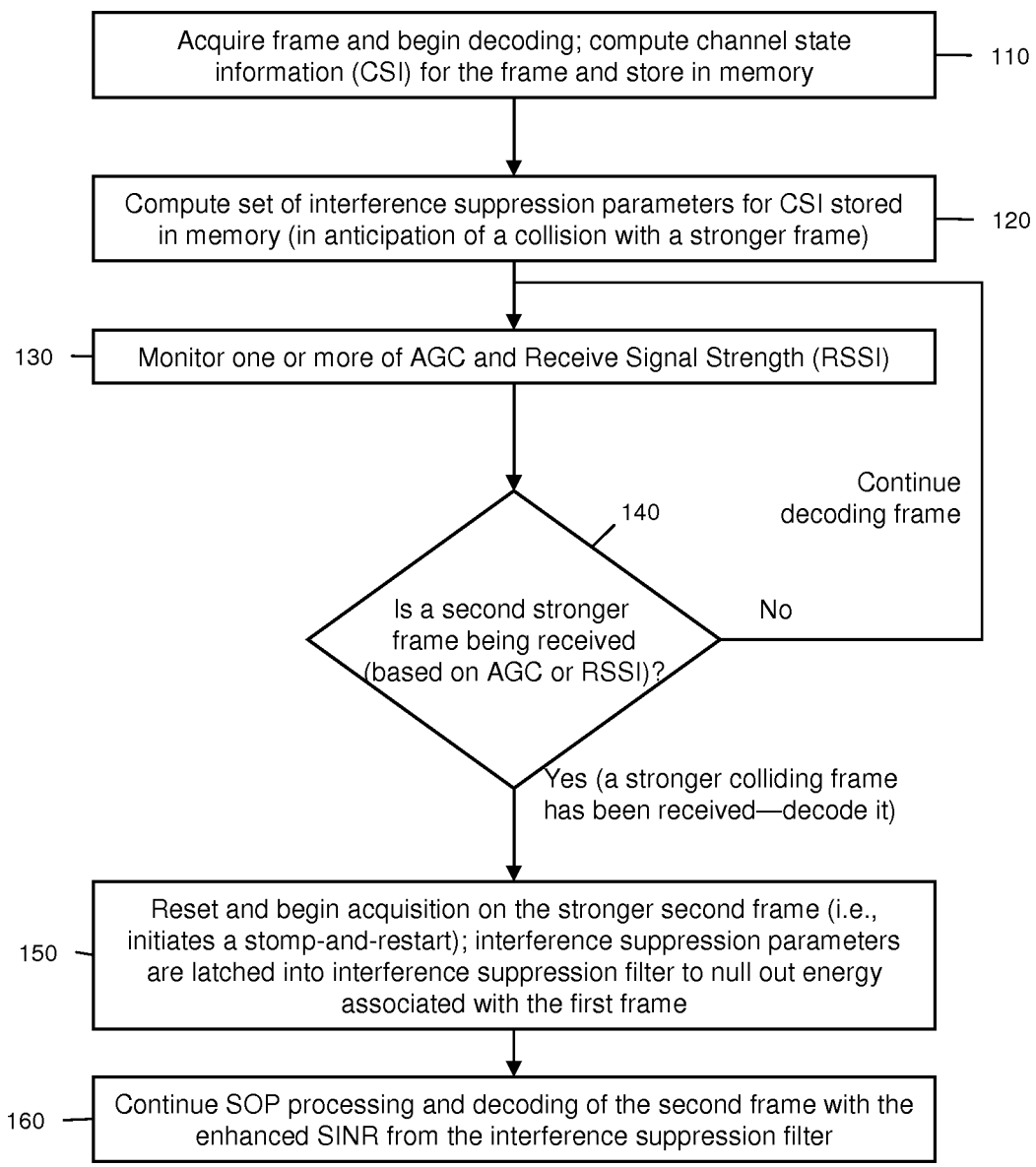
FIG. 3 is a flow chart depicting the operations associated with the enhanced stomp-and-restart techniques.
Figure 4:
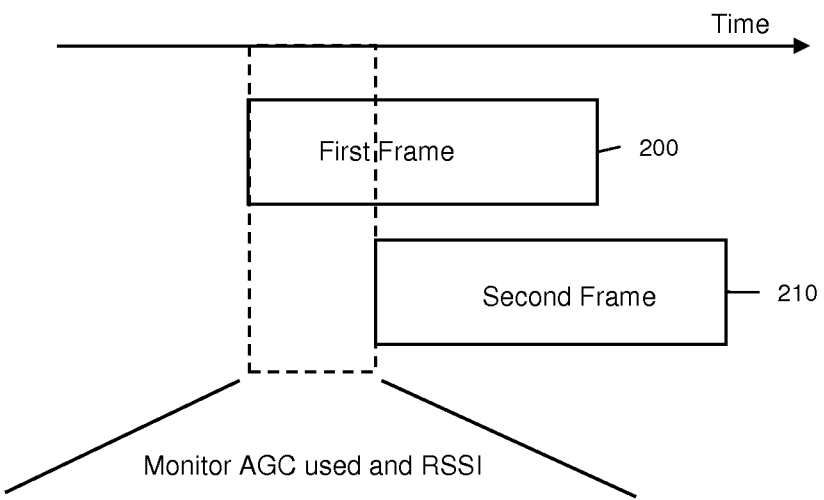
FIG. 4 is a diagram graphically illustrating the operations of the enhanced stomp-and-restart techniques.

Reference is now made to FIGS. 3 and 4 for a description of the operations of the enhanced stomp-and-restart operations performed, for example, by AP 10. Reference is also made to FIGS. 1 and 2 for purposes of describing these operations. The AP receives at its plurality of antennas, energy in a channel in which one or more frames may be transmitted to from any one of a plurality of other wireless communication devices, e.g., CDs 20(1)-20(N) shown in FIG. 1. At 110, the AP acquires a frame (referred to as a first frame here arbitrarily to contrast it with another colliding frame), if one is present in the received energy, and begins decoding the first frame. The first frame is shown at reference numeral 200 and a second frame is shown at reference numeral 210 in FIG. 4. In addition, the AP computes CSI for the first frame and stores the CSI in memory. At 120, the AP computes a set of interference suppression parameters for the CSI stored in memory for the first frame (in anticipation of a collision with a stronger frame).

At 130, the AP monitors one or more of the AGC computed by the AGC and SOP logic 52 and the RSSI measurements made by the RSSI measurement filter 50. The purpose of operation 130 is to gather information that indicates whether a second stronger frame is being received that collides with the first frame.

At 140, the AP determines whether a stronger second frame is being received. For example, the determination at 140 is based on whether there is a change in any one of AGC or RSSI that is greater than a corresponding trigger threshold. If there is a change in at least one of these quantities that is greater than its corresponding trigger threshold, then it is declared that a stronger second frame has been received and therefore that stronger second frame should be decoded and not the first frame. Otherwise, the process returns back to operation 140 and the first frame that was being received is continued to be decoded.

At 150, the AP restarts SOP processing and decoding of the stronger second frame (i.e., initiates a stomp-and-restart) and the interference suppression parameters computed at 120 are latched into spatial interference suppression filter. The spatial interference suppression filter nulls out the energy associated with the first frame so that processing of the stronger second frame is based on samples of energy in which the first frame, now viewed as interference to the processing of the stronger second frame, is suppressed or spatially nulled-out.

At 160, the AP continues SOP processing and decoding of the stronger second frame with the enhanced signal-to-interference-plus-noise ratio (SINR) resulting from application of the interference suppression parameters by the spatial interference suppression filter to the digital antenna-specific signals (post FFT processing).

According to the enhanced stomp-and-restart techniques described herein, the receiving device treats every frame as potential interference and computes interference suppression parameters to null out the frame. If a stronger frame is then received (e.g., from a hidden CD closer to the receiving device), the receiving device detects the presence of the stronger frame, loads the previous frame's interference suppression parameters and restarts SOP processing and decoding on the stronger frame.

Existing stomp-and-restart techniques are only useful for data rates with low SINR (only a few dB) to decode requirements. However, in modern wireless communication systems and networks, frames are sent with higher modulation and coding schemes and with more than 10 dB SINR (usually 15 to 20 dB). The enhanced stomp-and-restart techniques described herein that use nulling of an existing weaker frame to "make way" for a colliding stronger frame are useful under a wider variety of conditions and transmission levels.

In summary, in one form, a method is provided comprising receiving energy at a plurality of antennas of a wireless communication device in a channel in which one or more frames may be transmitted to the wireless communication device from any one of a plurality of other wireless communication devices; acquiring a first frame from the received energy; computing channel state information for the first frame and storing the channel state information associated with the first frame; computing interference suppression parameters for the first frame from the channel state information; determining whether a stronger second frame is being received by the wireless communication device; nulling out the energy associated with the first frame using the interference suppression parameters when the stronger second frame is determined to be received; and performing start-of-packet processing and decoding of the stronger second frame.

In another form, an apparatus is provided comprising a radio receiver unit configured to downconvert energy detected at each of a plurality of antennas to produce a plurality of antenna-specific receive signals, and a baseband signal processor unit coupled to the radio receiver unit. The baseband signal processor unit is configured to: acquire a first frame from the received energy; compute channel state information for the first frame and storing the channel state information associated with the first frame; compute interference suppression coefficients for the first frame from the channel state information; determine whether a stronger second frame is being received; null out the energy associated with the first frame using the interference suppression parameters when the stronger second frame is determined to be received; and perform start-of-packet processing and decoding of the stronger second frame.

In yet another form, one or more computer readable storage media encoded with software comprising computer executable instructions and when the software is executed operable to: acquire a first frame transmitted in a channel from energy detected at a plurality of antennas of a wireless communication device; compute channel state information for the first frame and storing the channel state information associated with the first frame; compute interference suppression coefficients for the first frame from the channel state information; determine whether a stronger second frame is being received; null out the energy associated with the first frame using the interference suppression parameters when the stronger second frame is determined to be received; and perform start-of-packet processing and decoding of the stronger second frame.

The above description is intended by way of example only.

What is claimed is:

1. A method comprising:
   at a plurality of antennas of a wireless communication device, receiving energy in a channel in which one or more frames may be transmitted to the wireless communication device from any one of a plurality of other wireless communication devices;
   acquiring a first frame from the received energy;
   computing channel state information for the first frame from the energy received at the plurality of antennas and storing the channel state information associated with the first frame;
   computing spatial interference suppression parameters for the first frame from the channel state information;
   determining whether a stronger second frame is being received by the wireless communication device after start-of-packet processing of the first frame and decoding has begun on the first frame;
   spatially nulling out the energy associated with the first frame using the spatial interference suppression parameters when the stronger second frame is determined to be received after start-of-packet processing of the first frame and decoding has begun on the first frame, in order to permit start-of-packet processing and decoding of the second frame that at least partially overlaps in time with the first frame; and
   performing start-of-packet processing and decoding of the stronger second frame after the spatially nulling so that the start-of-packet processing and decoding is performed on the basis of the stronger second frame and not the first frame.

2. The method of claim 1, and further comprising monitoring one or more of a level of automatic gain control associated with a receiver unit in the wireless communication device and a receive signal strength associated with the received energy.

3. The method of claim 2, wherein determining comprises determining that the stronger second frame is present based on a change in at least one of a level of the automatic gain control and the receive signal strength.

4. The method of claim 3, wherein determining comprises determining that the stronger second frame is being received when a change in at least one of the level of the automatic gain control and the receive signal strength exceeds a corresponding threshold.

5. The method of claim 4, wherein determining comprises comparing the change in the level of the automatic gain control with a gain control change threshold and the change in receive signal strength with a signal strength change threshold.

6. The method of claim 1, and further comprising supplying the spatial interference suppression parameters to a spatial interference suppression filter.

7. The method of claim 6, wherein computing the spatial interference suppression parameters comprises computing receive beamforming weight vectors configured to spatially null out energy associated with the first frame.

8. The method of claim 6, wherein the spatial interference suppression filter is a time-domain interference suppression filter, and wherein computing the spatial interference suppression parameters comprises computing coefficients for use by the time-domain interference suppression filter.

9. An apparatus comprising:
a radio receiver unit configured to downconvert energy detected at each of a plurality of antennas to produce a plurality of antenna-specific receive signals; and
a baseband signal processor unit coupled to the radio receiver unit, wherein the baseband signal processor unit is configured to:
acquire a first frame from the received energy;
compute channel state information for the first frame from the energy received at the plurality of antennas and store the channel state information associated with the first frame;
compute spatial interference suppression coefficients for the first frame from the channel state information;
determine whether a stronger second frame is being received after start-of-packet processing of the first frame and decoding has begun on the first frame;
spatially null out the energy associated with the first frame using the spatial interference suppression parameters when the stronger second frame is determined to be received after start-of-packet processing of the first frame and decoding has begun on the first frame, in order to permit start-of-packet processing and decoding of the second frame that at least partially overlaps in time with the first frame; and
perform start-of-packet processing and decoding of the stronger second frame after spatially nulling so that the start-of-packet processing and decoding is performed on the basis of the stronger second frame and not the first frame.

10. The apparatus of claim 9, wherein the baseband signal processor is further configured to monitor one or more of a level of automatic gain control associated with a radio receiver unit and a receive signal strength associated with the received energy.

11. The apparatus of claim 10, wherein the baseband signal processor is configured to determine that the stronger second frame is present based on a change in at least one of the level of the automatic gain control and the receive signal strength.

12. The apparatus of claim 11, wherein the baseband signal processor is configured to determine that the stronger second frame is present when a change in at least one of the level of the automatic gain control and the receive signal strength exceeds a corresponding threshold.

13. The apparatus of claim 12, wherein the baseband signal processor is configured to compare the change in the level of the automatic gain control with a gain control change threshold and the change in receive signal strength with a signal strength change threshold.

14. The apparatus of claim 9, wherein the baseband signal processor is configured to supply the spatial interference suppression parameters to a spatial interference suppression filter.

15. The apparatus of claim 14, wherein the interference suppression filter is configured to filter samples of the first frame using the interference suppression parameters to null out energy associated with the first frame.

16. The apparatus of claim 15, wherein the spatial interference suppression filter is a time-domain interference suppression filter, and wherein the baseband signal processor is configured to compute coefficients for use by the time-domain interference suppression filter.

17. One or more non-transitory computer readable storage media encoded with software comprising computer executable instructions and when the software is executed to:
acquire a first frame transmitted in a channel from energy detected at a plurality of antennas of a wireless communication device;
compute channel state information for the first frame from the energy received at the plurality of antennas and store the channel state information associated with the first frame;
compute spatial interference suppression coefficients for the first frame from the channel state information;
determine whether a stronger second frame is being received after start-of-packet processing of the first frame and decoding has begun on the first frame;
spatially null out the energy associated with the first frame using the spatial interference suppression parameters when the stronger second frame is determined to be received after start-of-packet processing of the first frame and decoding has begun on the first frame, in order to permit start-of-packet processing and decoding of the second frame that at least partially overlaps in time with the first frame; and
perform start-of-packet processing and decoding of the stronger second frame after spatially nulling so that the start-of-packet processing and decoding is performed on the basis of the stronger second frame and not the first frame.

18. The non-transitory computer readable storage media of claim 17, and further comprising instructions to monitor one or more of a level of automatic gain control associated with a radio receiver unit and a receive signal strength associated with the received energy.

19. The non-transitory computer readable storage media of claim 18, wherein the instructions that are to determine comprise instructions to determine that the stronger second frame is present based on a change in at least one of the level of the automatic gain control and the receive signal strength.

20. The non-transitory computer readable storage media of claim 19, wherein the instructions to determine comprise instructions to compare the change in the level of the automatic gain control with a gain control change threshold and the change in receive signal strength with a signal strength change threshold.

21. The non-transitory computer readable storage media of claim 17, and further comprising instructions that are to filter samples of the first frame with spatial interference suppression filter using the spatial interference suppression parameters to spatially null out energy associated with the first frame.

22. The non-transitory computer readable storage media of claim 17, wherein the instructions to determine whether the stronger second frame is being received comprises comparing a change in a level of an automatic gain control with a gain control threshold and a change in receive signal strength with a signal strength change threshold.

* * * * *